2,785,161

3,6-BIS(DI-LOWER-ALKYLAMINO)PYRIDAZINES AND PREPARATION THEREOF

Edgar Alfred Steck, Albany, N. Y., assignor to Sterling Drug Inc., New York, N. Y., a corporation of Delaware No Drawing. Application January 21, 1955, Serial No. 483,414

12 Claims. (Cl. 260—250)

This invention relates to new chemical compounds, in particular 3,6-bis(di-lower-alkylamino)pyridazines and quaternary ammonium salts thereof, and to methods for their preparation. The new 3,6-bis(di-lower-alkylamino)-pyridazines have the formula

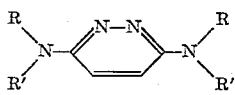

wherein R and R' are lower-alkyl groups which can be the same or different.

In the above general formula R and R' represent lower-alkyl groups which can be the same or different, straight or branched and preferably include from one to about six carbon atoms, thus including such groups as methyl, ethyl, propyl, isopropyl, butyl, isobutyl, tertiary-butyl, pentyl, isopentyl, hexyl, isohexyl, and the like.

The 3,6-bis(di-lower-alkylamino)pyridazines are prepared by reacting a 3,6-dihalopyridazine, where the halogen atom is chlorine or bromine, with a di-lower-alkyl-amine, preferably in a solvent chemically inert under the conditions of the reaction. The reaction mixture is preferably heated to maintain it at a temperature in the range between about 100° C. and 200° C. At least two moles of di-lower-alkylamine per mole of 3,6-dihalopyridazine is required in the reaction, and it is preferred to use a large excess of di-lower-alkylamine to take up the hydrogen chloride formed in the reaction.

The quaternary ammonium salts of the invention are derived from the addition of an ester of an inorganic or organic acid to a 3,6-bis(di-lower-alkylamino)pyridazine. The preferred types of quaternary ammonium salts are those whose anions are relatively innocuous to animal organisms in therapeutic doses of the salts, so that the beneficial physiological properties are not vitiated by side effects ascribable to the anions. Exemplary of the quaternary ammonium salts of the invention are those obtained by the addition of alkyl, alkenyl or aralkyl esters of strong inorganic acids or organic sulfonic acids to the free base form of the compounds. The alkyl, alkenyl or aralkyl esters so used include such compounds as methyl chloride, methyl bromide, methyl iodide, ethyl bromide, propyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, p-methylsulfonylbenzyl bromide, and the like.

The quaternary ammonium salts of the invention can be represented by the formula $Z \cdot (R''X)_n$, wherein Z stands for a 3,6-bis(di-lower-alkylamino)pyridazine having the above graphic formula, R'' stands for a hydrocarbon radical, X stands for an anion, and n is an integer from 1 to 2, depending upon whether one or both of the basic nitrogens in the molecule have been quaternized. Preferred types of the hydrocarbon group R'' are those having from one to about ten carbon atoms selected from lower-alkyl, lower-alkenyl, and monocarbocyclic aryl-lower-alkyl groups, the last being intended to include such groups wherein the aryl ring is substituted by inert substituents such as lower-alkyl, lower-alkoxy, halo and nitro.

The quaternary ammonium salts are prepared by reacting the amine Z with a compound R''X wherein X is the anion of a strong acid, preferably in an inert organic solvent. Heating may be used to facilitate the reaction. The quaternary ammonium salt separates directly or can be obtained by concentration of the solution. If one mole of the ester R''X is used a monoquaternary ammonium salt is obtained. If two or more moles of ester R''X are used, and a sufficiently high temperature (at least about 80° C.) and time of reaction (at least several hours) is employed, a bis-quaternary ammonium salt is obtained.

It is also possible to convert one quaternary ammonium salt to another in which the anion X is different. If the anion X forms a water-insoluble silver salt, the quaternary ammonium salt will react with silver oxide in aqueous medium to form the corresponding quaternary ammonium hydroxide. The latter can then be neutralized with any desired acid, weak or strong, to produce a new quaternary ammonium salt in which the anion is different from that of the original quaternary salt. In this way quaternary ammonium salts in which the anion X is derived from a weak acid can be obtained. For example, 3,6-bis(dimethylaminopyridazine bismethiodide dissolved in water can be reacted with silver oxide to give a solution of the corresponding bis-ammonium hydroxide. The precipitate of silver iodide is removed by filtration, and the filtrate can then be treated with an equivalent amount of acetic acid and the solution then concentrated to give 3,6-bis(dimethylamino)pyridazine bismethoacetate.

The following will further illustrate the invention: 44.7 g. (0.3 mole) of 3,6-dichloropyridazine was dissolved in 514 g. of a 23% (by weight) methanolic solution of dimethylamine, and the solution was heated at 120–125° C. in a shaking autoclave for twenty-four hours. The reaction mixture was cooled, concentrated in vacuo, and the residue was made strongly basic with 50% sodium hydroxide solution. The solid material which formed was collected by filtration, washed with water and dried, giving 49.8 g. of 3,6-bis(dimethylamino)pyridazine, M. P. 127–130° C. A sample when recrystallized twice from cyclohexane was obtained in the form of yellow prisms, M. P. 136–138.5° C.

Analysis.—Calculated for $C_8H_{14}N_4$: C, 57.80; H, 8.49; N, 33.71. Found: C, 57.90; H, 8.76; N, 33.96.

If in the above procedure the dimethylamine is substituted by a molar equivalent amount of diethylamine, ethylmethylamine, dipropylamine, diisopropylamine, dibutylamine, dipentylamine, or dihexylamine, there is obtained, respectively, 3,6-bis(diethylamino)pyridazine, 3,6-bis[di-(ethylmethylamino)]-pyridazine, 3,6-bis(dipropylamino)pyridazine, 3,6-bis(diisopropylamino)pyridazine, 3,6-bis(dibutylamino)pyridazine, 3,6-bis(dipentylamino)-pyridazine, or 3,6-bis(dihexylamino)pyridazine.

A solution of 8.3 g. (0.05 mole) of 3,6-bis(dimethylamino)pyridazine and 32.4 g. (0.15 mole) of p-nitrobenzyl bromide in 50 cc. of ethanol was heated to reflux temperature for one-half hour. Upon cooling and adding ether there separated from solution a crystalline material (21.8 g., M. P. 90–92° C.) which was recrystallized several times from an ethanolpentane mixture, giving 3,6-bis(dimethylamino)pyridazine mono - (p - nitrobenzobromide), M. P. 122.5–123° C.

Analysis.—Calculated for $C_{15}H_{20}BrN_5O_2$: C, 47.13; H, 5.27; N(basic), 3.66; N(nitro), 3.66. Found: C, 47.19; H, 4.98; N(basic), 3.50; N(nitro), 3.53.

If in the procedure just described the reaction mixture is heated several hours, the bis(p-nitrobenzobromide) salt can be obtained.

If the p-nitrobenzyl bromide in the procedure described above is replaced by methyl iodide, methyl bromide, ethyl bromide, allyl bromide, benzyl chloride, o-chlorobenzyl chloride, p-methylbenzyl chloride, or p-methoxybenzyl chloride, there is obtained, respectively, the methiodide, methobromide, ethobromide, allobromide, benzochloride, o-chlorobenzochloride, p-methylbenzochloride, or p-methoxybenzochloride of 3,6-bis(dimethylamino)pyridazine.

Pharmacological evaluation of the quaternary ammonium salts of the compounds of the above formula shows that these substances possess ganglionic blocking activity when tested in dogs by the carotid occlusion method, which indicates their usefulness as hypotensive agents. The 3,6-bis(di-lower-alkylamino)pyridazines themselves are useful as starting materials for the preparation of the quaternary ammonium salts.

I claim:

1. A compound selected from the group consisting of 3,6-bis(di-lower-alkylamino)pyridazines and quaternary ammonium salts thereof, the quaternizing moieties of which do not substantially increase the toxicity of the compound toward animal organisms.

2. 3,6-bis(di-lower-alkylamino)-pyridazines.

3. Quaternary ammonium salts of 3,6-bis(di-lower-alkylamino)pyridazines having quaternizing moieties which do not substantially increase the toxicity of the compound toward animal organisms.

4. Monocarbocyclic aryl-lower-alkyl halide salts of 3,6-bis(di-lower-alkylamino)pyridazines having quaternizing moieties which do not substantially increase the toxicity of the compound toward animal organisms.

5. 3,6-bis(dimethylamino)pyridazine.

6. Monocarbocyclic aryl-lower-alkyl halide salts of 3,6-bis(dimethylamino)pyridazine having quaternizing moieties which do not substantially increase the toxicity of the compound toward animal organisms.

7. 3,6-bis(dimethylamino)pyridazine 4-nitrobenzobromide.

8. The process for preparing a 3,6-bis(di-lower-alkylamino)pyridazine which comprises reacting a compound selected from the group consisting of 3,6-dichloropyridazine and 3,6-dibromopyridazine with a di-lower-alkylamine.

9. The process for preparing a 3,6-bis(di-lower-alkylamino)pyridazine which comprises reacting a compound selected from the group consisting of 3,6-dichloropyridazine and 3,6-dibromopyridazine with a di-lower-alkylamine in a solvent chemically inert under the conditions of the reaction, at a temperature between about 100° C. and 200° C.

10. The process for preparing a quaternary ammonium salt of a 3,6-bis(di-lower-alkylamino)pyridazine which comprises reacting a 3,6-bis(di-lower-alkylamino)pyridazine with a member of the class consisting of lower-alkyl, lower-alkenyl and monocarbocyclic aryl-lower-alkyl esters of strong acids, said esters being those which do not substantially increase the toxicity of said quaternary ammonium salt toward animal organisms.

11. The process for preparing 3,6-bis(dimethylamino)-pyridazine which comprises reacting 3,6-dichloropyridazine with dimethylamine in a solvent chemically inert under the conditions of the reaction, at a temperature between about 100° C. and 200° C.

12. The process for preparing 3,6-bis(dimethylamino)-pyridazine 4-nitrobenzobromide which comprises reacting 3,6-bis(dimethylamino)pyridazine with at least one molar equivalent of 4-nitrobenzyl bromide.

References Cited in the file of this patent
UNITED STATES PATENTS

| | | |
|---|---|---|
| 2,484,785 | Druey | Oct. 11, 1949 |
| 2,671,086 | Rogers et al. | Mar. 2, 1954 |